July 10, 1945.　　　J. P. SLOAN　　　2,380,082
APPARATUS FOR USE IN EVALUATING GAS RESERVOIRS
Filed Jan. 19, 1944　　　4 Sheets-Sheet 2
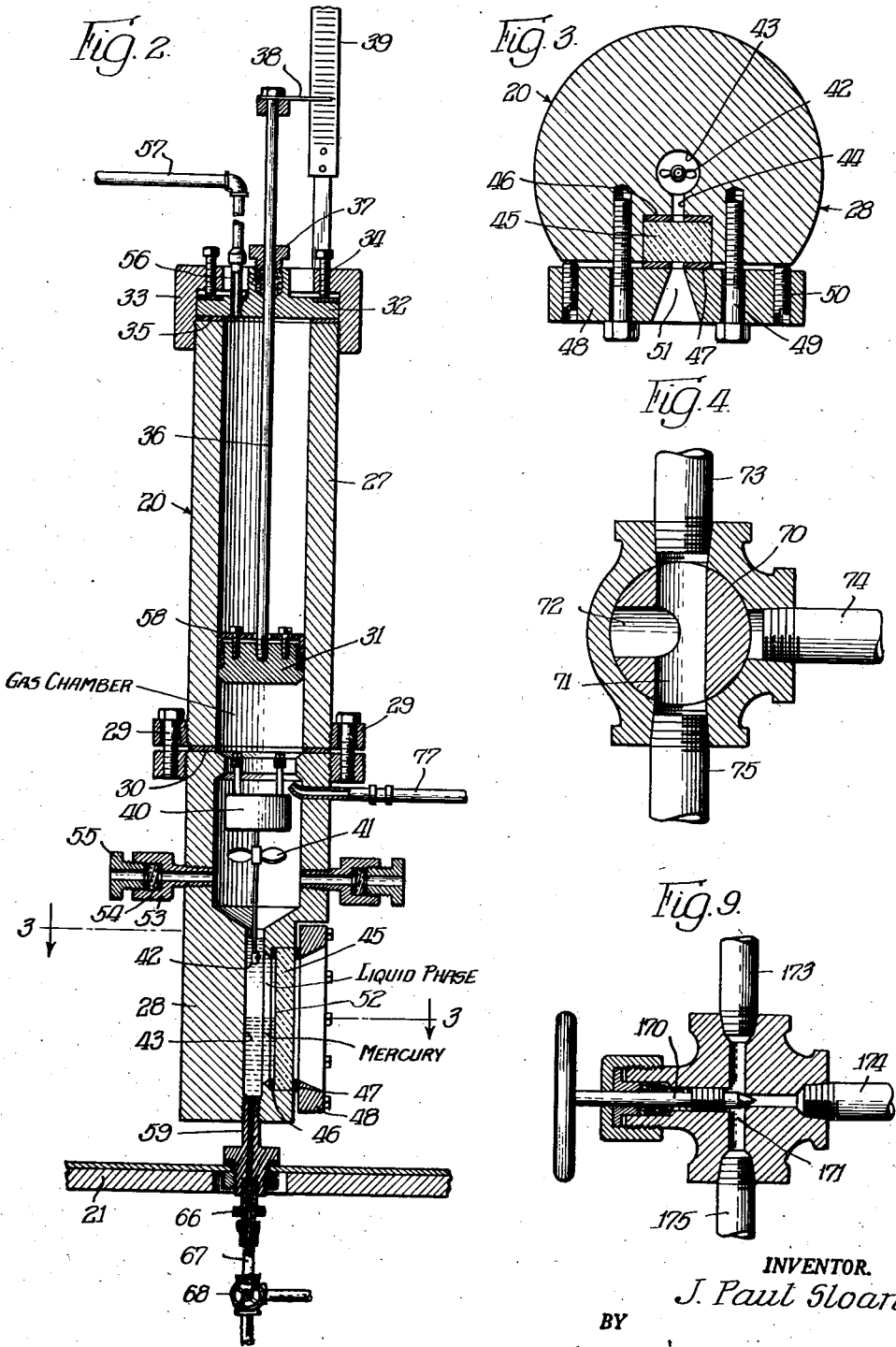
INVENTOR.
J. Paul Sloan, July 10, 1945. J. P. SLOAN 2,380,082
APPARATUS FOR USE IN EVALUATING GAS RESERVOIRS
Filed Jan. 19, 1944 4 Sheets-Sheet 3

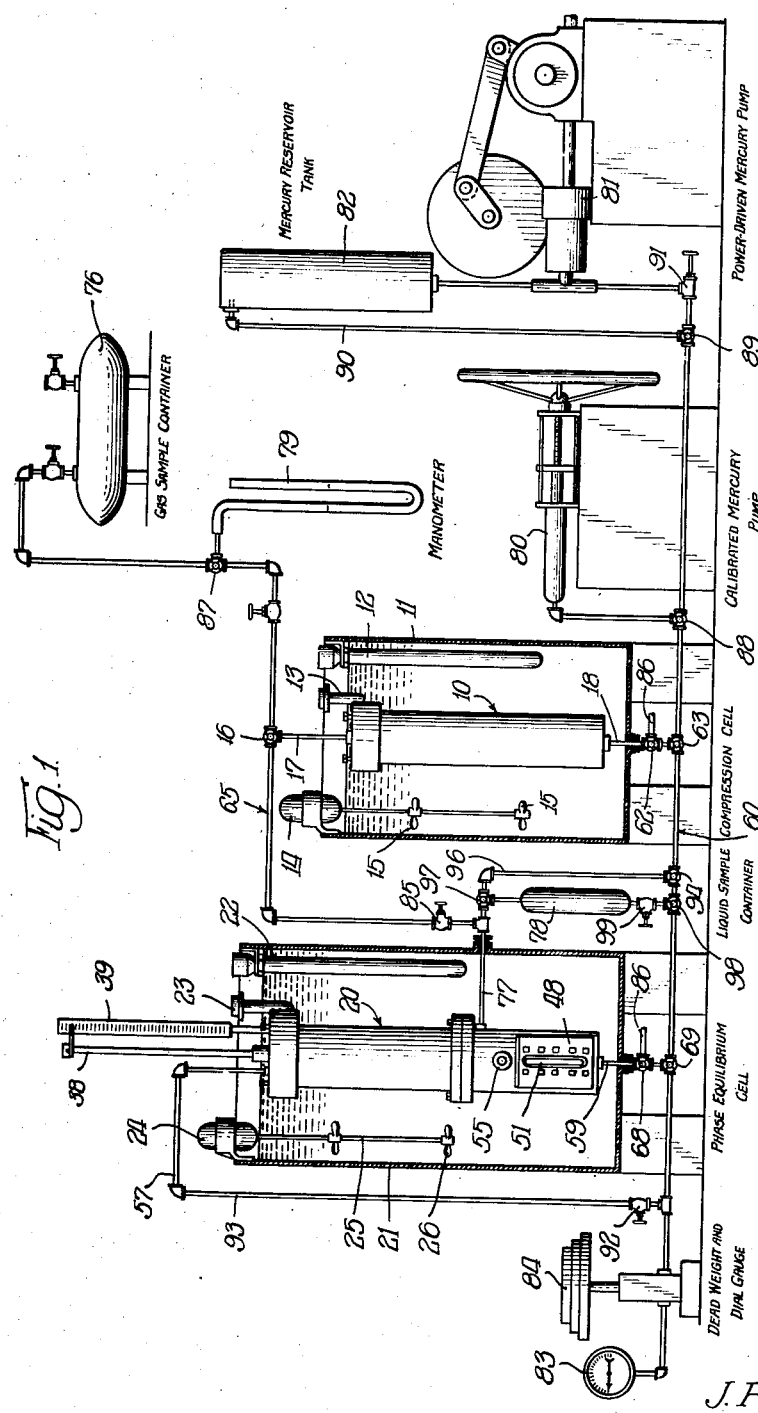

INVENTOR.
J. Paul Sloan,
BY

July 10, 1945.  J. P. SLOAN  2,380,082
APPARATUS FOR USE IN EVALUATING GAS RESERVOIRS
Filed Jan. 19, 1944  4 Sheets-Sheet 4
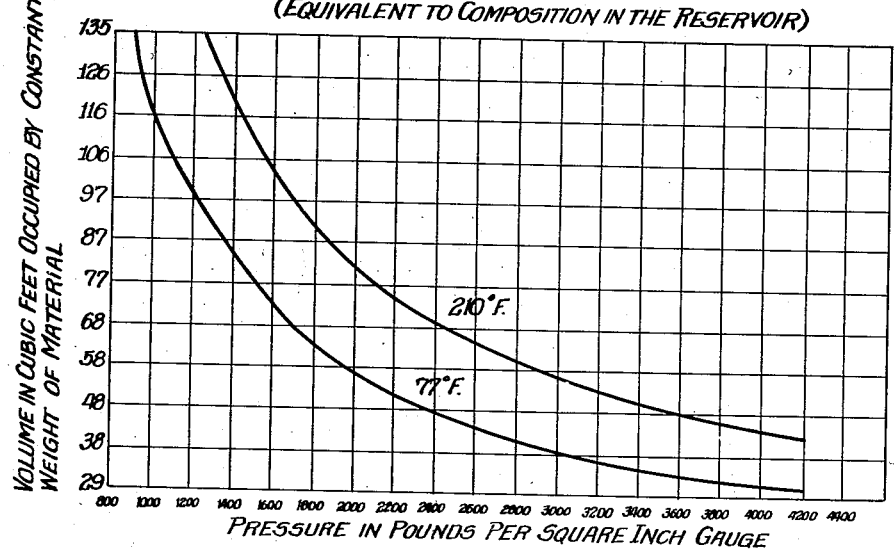
Fig. 7. PRESSURE-VOLUME RELATIONSHIP OF 1791.2 CUBIC FEET OF SEPARATOR GAS AT 14.7 POUNDS ABSOLUTE AND 60°F, AND 1.0 GALLON OF SEPARATOR FLUID AT 60°F. (EQUIVALENT TO COMPOSITION IN THE RESERVOIR)
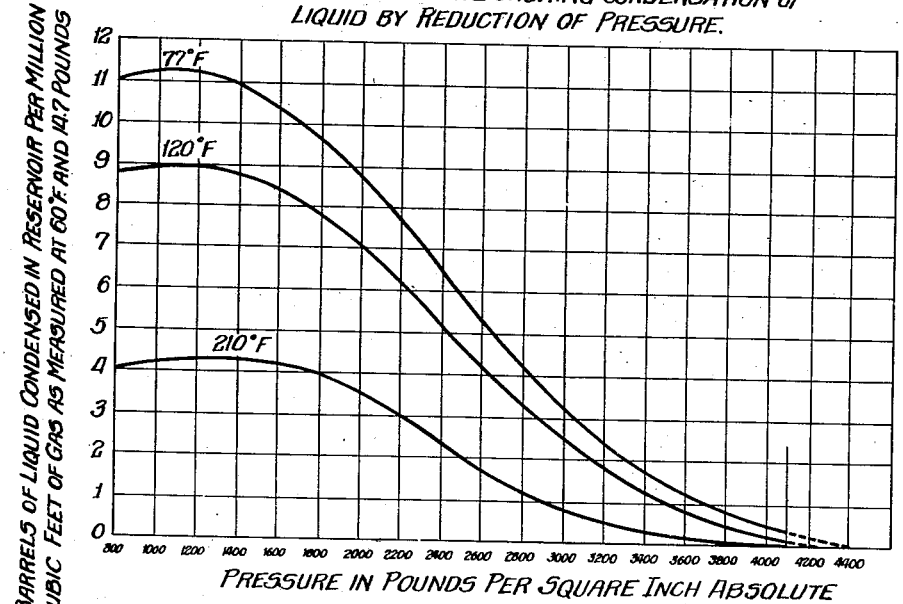
Fig. 8. LIQUID PHASE CURVE SHOWING CONDENSATION OF LIQUID BY REDUCTION OF PRESSURE.
INVENTOR.
J. Paul Sloan,
BY Patented July 10, 1945

2,380,082

UNITED STATES PATENT OFFICE 2,380,082

APPARATUS FOR USE IN EVALUATING GAS RESERVOIRS

James Paul Sloan, Houston, Tex., assignor to Houston Laboratories, Houston, Tex., a corporation of Texas Application January 19, 1944, Serial No. 518,832

9 Claims. (Cl. 73—23)

The invention relates to apparatus for use in evaluating the content of gas reservoirs, gas distillate reservoirs and the gas cap of oil reservoirs for planning the development of such reservoirs and determining the most efficient operating conditions for the production of these properties. More specifically the invention relates to improved apparatus for analyzing fluid from said reservoirs to obtain information as to the compressibility of the gaseous phase and graphical data such as the behavior of the reservoir material under reservoir pressure and temperature and under reduced pressures and temperatures to make possible the most satisfactory and profitable production of the reservoir.

This application is a continuation-in-part of my copending application Serial No. 436,295, filed March 26, 1942 and entitled Method of evaluating the content of gas reservoirs. In said application it was explained that the evaluation of the hydrocarbon reservoir as above referred to resides in determining the volume of gas and distillate or other liquid hydrocarbons that can be ultimately produced therefrom. It was further explained that the term "behavior" as used herein refers to the change in the composition of the liquid and gas phases of the reservoir material with any corresponding change in temperature and/or pressure.

Natural gas and petroleum are mixtures of hydrocarbons, the simplest of these being methane, composed of one carbon atom surrounded by four hydrogen atoms. Theoretically, there is a definite compound identified as methane containing in addition to hydrogen the one carbon atom, a second identified as ethane containing two carbon atoms; propane containing three carbon atoms and so on up to a definite compound of forty carbon atoms. As the chemical structure becomes more complex isomers are formed such as iso-butane, which is the isomer of normal butane. All natural gases are composed of a mixture of the lighter hydrocarbons, and the crude oils, asphalts and tars are mixtures of the heavier ones. No two of these mixtures is identical in composition and from the enormous number of possible compounds and the wide variation of their properties, it is easy to see the impossibility of analyzing each of these mixtures with accuracy. Both the time and the cost would be prohibitive. So, for convenience the light ends are analyzed by cooling and fractional distillation with some degree of accuracy up through compounds containing six or seven carbon atoms. The boiling points of these compounds are relatively far apart and they can be separated easily. The higher boiling compounds, whose boiling points are successively closer together, are then grouped according to boiling range, and no attempt is made to separate the individual members of these groups.

Under atmospheric conditions of temperature and pressure, the first four hydrocarbons are in the gaseous state, the next three or four are liquid but highly volatile, the remainder are from relatively stable liquid to solid. However, in the natural reservoir, quite a different set of conditions is present. The temperatures are higher, ranging from 140° F. to approximately 300° F. with even higher temperatures in prospect with the advent of deeper drilling. This increased temperature tends to vaporize the lighter portions of the normally liquid hydrocarbon mixture described above and to convert the normally solid paraffines and tarry portions to the liquid state. The pressures in these reservoirs range from a few pounds per square inch above atmospheric pressure to approximately six thousand pounds per square inch. These pressures tend to reverse the vaporization effect of the elevated temperatures and to reliquify the ethane to octane group and to force the methane into solution in the liquid. This stripping of the ethane-plus portions of the gas by increasing pressure continues until the pressures reach approximately nine hundred to one thousand pounds per square inch. In this region the process of squeezing the ethane-plus materials out of the methane comes to a halt, and as the pressure further increases a reversal sets in. From here on, the ethane plus material begins to reenter the vapor phase, the lighter materials in larger quantities than the heavier. This process continues with successively heavier materials going into the vapor phase as the pressure continues to rise. This phenomenon is known as "retrograde vaporization," which means the vaporization is taking place under conditions which are normally expected to produce condensation. Conversely, when the pressure on this vaporized material is reduced, the first of the heavy, then the successively lighter compounds, begin to condense to the liquid phase. This phenomenon is known as "retrograde condensation."

With the advent of deep drilling in the search for petroleum a number of high pressure, high temperature gas reservoirs have been encountered. Many of these gases contain significant quantities of the heavier hydrocarbons held in the vapor phase by virtue of the pressure and temperature of the reservoir. In the normal production of these reservoirs, as part of the gas content is withdrawn the pressure upon the remainder is lowered. This lowering of pressure on the remaining reservoir fluid causes a condensation of some of the heavier hydrocarbons. Continued withdrawals of material causes a continuing condensation until the pressure in the reservoir drops to approximately one thousand pounds per square inch. The liquid condensate thus precipitated serves to wet the surrounding sand body and is thereby forever lost.

There has been developed in recent years a system of operation known as "cycling" or "recycling," which is designed to prevent this irretrievable loss of material in these condensate or distillate reservoirs. In this process, gas is withdrawn from a well in one part of the field, transmitted by pipe lines to a plant, and there processed by means of pressure reduction and absorption for the removal of the condensable portions of material, the residual gas being then recompressed to above formation pressure, and reinjected into another part of the reservoir. This procedure tends to maintain approximately the original reservoir pressure and thereby prevents precipitation of the heavier hydrocarbons; also the liquid material composed of gasoline and kerosene fractions is recovered for immediate sale and the excess gas is conserved for future use.

The volume of the recoverable liquid varies widely with different reservoirs. The rates at which it is condensed by pressure reduction is a function of the particular composition of the material in the reservoir. Therefore, in order for the owners to know whether or not the loss of this liquid by normal withdrawal of the reservoir contents justifies recycling, it is necessary that they know the behavior of the material in the reservoir under reservoir temperature and diminishing pressure. Such information would enable the owners to make a decision as to recycling, absorption, or a simple separation operation as the most profitable method of producing the reservoir. A knowledge of the behavior of the reservoir material at both a reduced pressure and a reduced temperature would enable the owners to independently plan a program for handling the material after it is brought to the surface, such as separator pressures, absorption pressures, etc. Compressibility data would enable him to select the proper pipe line size, compressor volumes, or any place in the operation where he might be dealing with pressure-volume-temperature relationships and to more closely estimate his reserve of liquid and gas and the reservoir energy available for the production of the reservoir.

An object of the invention is to provide apparatus wherein samples of the liquid and gas comprising the reservoir fluid of a stabilized well can be analyzed and recombined in certain desired ratios of volume of liquid to volume of gas whereby to secure desirable information pertaining to said reservoir fluid.

Another object resides in the provision of apparatus including a variable volume cell within which the liquid and gas samples are recombined. The combination of liquid and gas thus produced represents the reservoir fluid entering the well tubing. The apparatus of the invention is capable of operation at a constant temperature and the pressure-liquid volume behavior of the reservoir fluid may be observed and recorded from separator pressure to reservoir pressure. It is also within the perview of the invention to provide thermostatic control for the apparatus so that any number of isothermal pressure-liquid volume curves may be obtained without disturbing the original charge with respect to composition.

A further object is to provide a variable volume cell for the purposes above described which will incorporate visibility features so that the different phases of the reservoir fluid may be actually observed and questionable readings may be checked for accuracy at any time up to the discarding of the sample.

A further object is to provide a fixed volume cell and apparatus whereby the same may be calibrated and operated to determine the pressure-volume relationship of the gas sample taken from the field separator. This compressibility data is of value in calculating the equivalent amount of the liquid to be added to a definite volume of the gas to obtain an equivalent mixture to that which entered the well bore from the formation during sampling. The advantage of this step in the present method resides in the fact that the calculations are made on the basis of the actual determined compressibility of the gas.

With these and various other objects in view, the invention may consist of certain novel features of construction and operation, as will be more fully described and particularly pointed out in the specification, drawings and claims appended hereto.

In the drawings which illustrate an embodiment of the device, and wherein like reference characters are used to designate like parts—

Figure 1 is an elevational view showing in operative relationship one preferred arrangement of apparatus for carrying out the method of the invention;

Figure 2 is a vertical sectional view taken substantially through the center of the variable volume cell and showing the movable piston for attaining different pressures and the stirring means for bringing the gas-liquid mixture to equilibrium;

Figure 3 is an enlarged transverse sectional view of the cell shown in Figure 2 taken substantially along line 3—3 of said figure and looking in the direction of the arrows;

Figure 4 is an enlarged sectional view illustrating the internal construction of a type of three-way valve that may be used in both the gas and the mercury manifolds;

Figure 7 is a graph showing two isothermal pressure-volume curves;

Figure 8 is a graph showing three isothermal liquid phase curves illustrating the condensation of liquid by reduction of pressure; and Figure 9 is a sectional view showing the internal construction of a cross-angle valve suitable for use in both the gas and mercury manifolds.

The apparatus of the invention has particular utility in the making of phase equilibrium determinations on recombined samples of liquid and gas of a distillate reservoir. When the apparatus is used for evaluating the contents of such a reservoir samples of the liquid and gas produced by the well are collected under the conditions of temperature and pressure which exist at the field separator. It is also necessary to measure the amounts of such production. Samples of the liquid may be taken from the separator by the downward displacement of mercury in a suitable container. Samples of the gas may be taken from a convenient tap in the gas line leading from the separator by purging the container and then closing the valves in such a manner as to build up and maintain the separator pressure. In actual practice the samples taken from the separator are usually at pressures ranging from 400 to 1000 pounds per square inch and said samples are maintained at this pressure until they are used in the present apparatus. The gas-oil ratio is accurately determined from the orifice meter data showing the gas produced and form the calibration of the separator by which the actual volume of the liquid produced during the period of test may be computed. These data together with the temperature of the separator and the temperature and pressure of the reservoir are the only field data required in the use of the present apparatus in evaluating a gas distillate reservoir as above referred to.

The first use to be made of the present apparatus is to obtain data as to the compressibility of the gas sample. For such tests the apparatus includes a fixed volume cell 10, which is shown in Figure 1 in associated relation with other parts of the apparatus and in Figure 5 in fragmentary cross section to illustrate the internal construction of the cell. The information as to compressibility of the gaseous phase is required for the precise measurement of the volume of gas to be injected, in accordance with the invention, into the equilibrium cell 20, Figures 1 and 2. The latter may be termed a variable volume cell in order to distinguish from cell 10.

Figure 5:
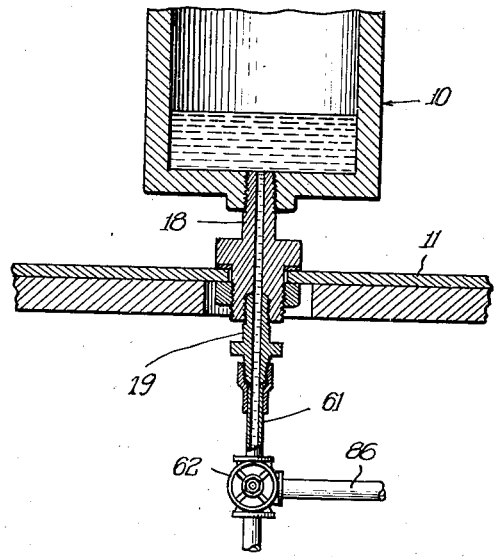
Figure 5 is a fragmentary sectional view showing in detail the interior of the fixed volume cell and the manner of connecting the mercury manifold thereto.

The cell 10 is immersed in oil within receptacle 11 and the electric heating unit 12 is provided for heating the oil to desired temperatures, which are thermostatically controlled by the thermo-regulator 13. The motor 14 provides a depending armature shaft to which is secured the stirring propellers 15. The cell 10 at its upper end is connected to a gas manifold, to be presently described in detail, by means of valve 16 and conduit 17. The bottom of the cell, as best shown in Figure 5, is equipped with a connection 18 which extends through the bottom wall of the receptacle 11, being joined by the nipple 19 with a mercury manifold so that mercury may be injected into the bottom of the fixed volume cell 10.

Following the compressibility determinations a definite volume of gas, which may be accurately calculated by the aid of the compressibility data, is injected into the variable volume cell 20 along with a definite amount of liquid to produce reservoir material equivalent to that which entered the well bore from the formation during sampling. In the variable volume cell a number of phase equilibrium determinations are made on said resultant mixture. The cell 20 is suitably supported within a cylindrical receptacle 21, substantially filled with oil providing an oil bath for the cell 20 since the cell is immersed in the oil. The bath may be heated by the electrical heating unit 22 thermostatically controlled by the thermo-regulator 23 so that the bath may be heated to the temperature desired and maintained at said temperature for the proper period. The electric motor 24, by means of its depending shaft 25 and the propellers 26, thoroughly stirs the heated oil within receptacle 21 to assure a uniform temperature throughout the oil bath.

Referring to Figure 2, the variable volume cell identified by numeral 20 consists of a steel cylinder which may be constructed of two parts, an upper portion 27 and a lower portion 28 for convenience, the said two parts being securely united by bolts 29 and which effect a hermetic seal between the two parts by means of the interposed gasket 30. The upper portion 27 containing the floating piston 31 is closed by the head 32 and by the retaining member 33 which fits over the head, having threaded connection with cylinder 27. By tightening the bolts 34 the cylinder head may be forced against the interposed gasket 35, thereby making a mercury-tight closure. The piston rod 36 passes through the cylinder head, which is provided with a packing gland 37. Said piston rod at its upper end carries an index pointer 38 which moves along the scale 39, thereby indicating to the nearest cubic centimeter the volume of space within the cell 20 below the piston 31.

Within the lower portion 28 of cell 20 there is located an electric motor 40 having an armature shaft depending therefrom to which is secured the large propeller 41 and the relatively small propeller 42, the latter being located within the bore 43 provided in the lower portion 28 of the cell. Large propeller 41 thoroughly agitates and mixes the gas below piston 31 and the small propeller is located at the extreme lower end of the shaft so as to project into and stir the liquid within bore 43. By means of this stirring equipment all portions of each phase, that is, the gas and the liquid, may be brought into intimate contact with each other so that equilibrium between them may be established in a short period of time. Bore 43 in portion 28 of the cell is provided with a relatively small slot 44 extending for approximately three-fourths of the length of the bore and which leads to the exterior so that the bore is thus opened by the slot.

In accordance with the invention the cell 20 is provided with visibility features whereby the liquid phase of the reservoir material within the cell may be observed. The slot 44 is therefore closed by the glass window 45 which is in contact with a slotted gasket 46. On the front side of this glass window there is positioned a similar slotted gasket 47 and said gasket and the glass window are securely held in position by the rectangular metal plate 48 bolted to the portion 28 of the cell by means of bolts 49. Adjustment of plate 48 is effected by the set screws 50. The interior of bore 43 is visible through window 45 by means of the longitudinal slot 51 in the said retaining plate 48. A window constructed in accordance with the foregoing has been safely tested to seven thousand pounds per square inch at 280° F. However, in case of breakage of the glass window the possibility of injury to the operator is negligible due to the very small unsupported area comprising the slot. It is impossible for an explosion to occur in a lateral direction nor can the gasket blow out toward the top or bottom as the ends are confined within the solid metal of the lower portion 28 of the cell. This window provides means whereby the operator may observe the liquid gas interface of the reservoir material within the cell and also the mercury-liquid interface which during operation of the apparatus is positioned at some point longitudinally of the bore 43. The small cross sectional area of bore 43 has the effect of increasing the length of the column of liquid and by means of a line scribed on the inside surface of window 45 a zero position 52 is provided for the measurement of both the liquid and gas volumes. The presence of this index on the inner face of the window eliminates the errors due to parallax which would be present if the index were on the outside.

Just above the restricted portion of cell 20 formed by the bore 43 there is provided additional windows so that the behavior of the gaseous phase within the cell may be observed by the operator. These windows are formed by the threaded cups 53 which are threaded into the cell so as to extend completely through the wall of the same. The cups are provided with an axial passage and it will be understood that the axial passage of one cup is aligned with that of the other so that a light placed in front of one is visible from the other side of the cell. If necessary, the cups may be disposed somewhat eccentric with respect to the axis of the cell in order that the armature shaft of motor 40 will not obstruct the passage of light. Each cup is provided with a glass window 54, the same being retained within the cup by means of the threaded closure 55, likewise having an axial passage aligned with that of the cup. The purpose of this set of windows is to provide a means of detecting the first formation of fog, that is, dew point of a mixture which has passed entirely through its critical region and has become a single phase system. As pressure on this single phase system is slowly reduced, the material will pass through a very definite point where the formation of minute droplets of liquid takes place. This "fogging" will cause a sharp decrease in the amount of light which passes through the mixture and this decrease can be readily observed by the eye and by means of a photo-electric cell. This procedure eliminates the guess work in determining the critical dew-point.

Referring again to the cylinder head 32 of the cell, the same has been tapped to receive a suitable tubing connector 56 which is screwed into the tapped hole. The tubing 57 supplies mercury to the connector which is thereby admitted within the cell 20 and above piston 31 to effect movement of the piston. The piston is provided with suitable packing and retaining means 58 whereby the pressure on the packing may be adjusted. This is all that is necessary as concerns the piston since the same is never subjected to a differential pressure greater than that necessary to move the piston in the cylinder against its own friction on the cylinder walls. In operation this pressure rarely exceeds fifty pounds per square inch differential and is easily taken care of by the packing on the piston. In addition the differential exists only during the period of movement of the piston and is not a factor worthy of consideration during the equilibrium determinations. The effect of the piston rod 36 is to slightly reduce the area of the top of the piston. Since the mercury above the piston has to support the thrust of the gas below, the resulting pressure of the mercury is always slightly higher than that within the gas chamber. Therefore any tendency toward leakage around the piston would be for the high pressure mercury to bypass the piston and enter the chamber below. This would not be detrimental to the reservoir fluid within the cell as the mercury can be withdrawn through the bottom connection 59, having threaded connection with the lower end of the bore 43.

The fixed volume cell 10 and the variable volume cell 20 are connected to the mercury manifold 60 by somewhat similar structure. The cell 10 has a connection 18 which extends through the bottom wall of receptacle 11 to join with nipple 19. From the nipple the conduit 61 connects with valve 62 and a similar valve 63 is located in the mercury manifold. The connection 59 of cell 20, which extends through the bottom wall of receptacle 21 is joined to the nipple 66 which in turn is threaded to conduit 67, connecting with the valve 68. By means of this valve and a substantially similar valve 69 mercury from manifold 60 may be admitted or withdrawn from bore 43.

The several different types of valves that may be used in the present invention are shown in detail in Figures 4 and 9. In the three-way valve of Figure 4 the rotatable element 70 is provided with a diametrically extending passage 71 having a lateral passage 72. By positioning the element 70 as shown in said figure, the conduits 73 and 75 are connected and conduit 74 is closed. In other positions of element 70 the conduit 73 may be joined to 74 or 74 may be joined to 75. The three-way valce of Figure 9 is known as a cross-angle valve, the same having a rotatable element 170 located in the passage 171. In this type of valve the rotatable element closes the conduit 174 only since conduits 173 and 175 are always in communication, being joined by passage 171. When a cross-angle valve is used in the mercury manifold it has the advantage that the pressure is continuously indicated by dial gauge 83 and piston gauge 84 since they are always connected to the mercury pump.

The gas manifold 65 is used for the transference of gas from the sample cylinder 76 to either of the cells 10, 20. Conduit 17 from the manifold delivers the gas to and conducts the same from the cell 10. The conduit 77 conducts gas from the manifold to cell 20, and in this case the said conduit also delivers liquid to the cell from the sample cylinder 78 having connection with both the gas manifold and the mercury manifold. The manometer 79 is used to measure accurately the original pressure of the gas in cell 10.

Mercury is supplied to manifold 60 by the calibrated mercury pump 80 and by the power driven pump 81. The latter is used for the bulk movement of mercury from the tank 82 into either cell 10 or 20. The calibrated pump 80 injects accurate quantities into cell 10 for the compressibility measurements, and said pump is also used in measuring the exact quantities of liquid from the sample container 78 to be delivered to cell 20, and in measuring the volume of residual manifold opposite the pumps a dial guage 83 and a dead weight or piston gauge 84 are provided for indicating the pressure existing in the manifold. The dial gauge indicates the approximate pressure and the piston gauge gives a more accurate measurement.

After the containers 76 and 78 for the gas and liquid samples, respectively, have been properly connected into the present apparatus, the operation of the same is as follows:

The cell 10 and cell 20 are both thoroughly washed with petrolic ether or other suitable solvent under a pressure of from one hundred pounds to four hundred pounds per square inch. This liquid is caused to enter the gas manifold 65 and by opening valves 16 and 85 the liquid is introduced into the respective cells, thoroughly washing all residual oily material which might be left from a previous determination and which would be a source of error. The washing solvent is withdrawn through valves 62 and 68, being expelled through the outlet conduit 86 provided for each of said valves. After closing the said outlet valves the cells 10 and 20 are dried by thoroughly evacuating them through the gas manifold. The cylinder 10 is now filled with gas from sample container 76 until the pressure is approximately ten pounds per square inch above atmospheric pressure. This pressure is accurately measured by means of the mercury manometer 79 which connects with the gas manifold through the three-way valve 87. Also the temperature of the oil surrounding cell 10, adjusted to approximately room temperature, is recorded to within plus or minus .2° F. by means of an ordinary thermometer suspended in the oil bath. By means of the application of the gas laws to the known volume of gas under the above described conditions of temperature and pressure, the actual volume of the sample within the cell 10 at standard conditions of 60° F. and 14.7 pounds per square inch absolute can readily be found. The object now is to determine the compressibility of this particular gas.

Figure 6:
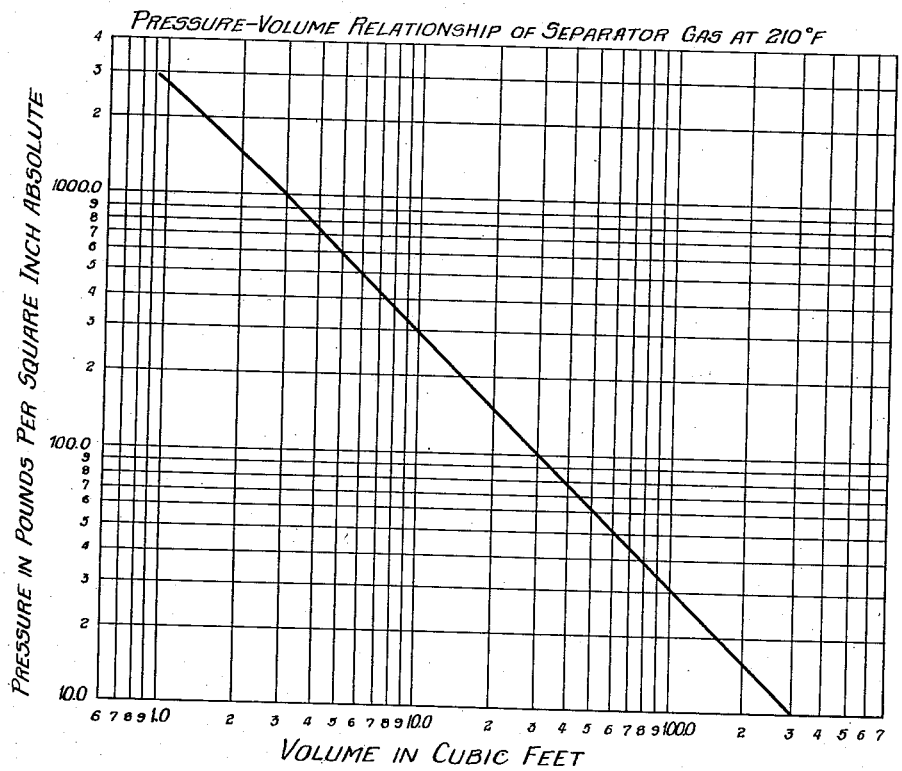
Figure 6 is a graph showing one pressure-volume curve of separator gas at 210° F.

For the compressibility determinations an accurately measured volume of mercury is injected into cell 10 by means of the calibrated mercury pump 80 which requires that valve 88 be opened to said pump and that valve 63 be opened to connect the cell with the mercury manifold. The resultant rise in pressure in cell 10 is indicated approximately by dial gauge 83 and the same may be accurately measured by the piston gauge 84. The reduced volume and increased pressure are recorded on a suitable form by the operator. An additional measured volume of mercury is now forced into cell 10 by pump 80 and this further reduced gas volume and further increased pressure are recorded in tabulated form with the first reading. This procedure is repeated until the gas pressure in cell 10 is of the order of one thousand to fifteen hundred pounds per square inch. During this procedure the cell 10 is maintained at a constant temperature, controlled by the thermo-regulator 13. The tabulated information is corrected as to volume by the application of the known behavior of mercury to temperature changes and to pressure changes. An adjustment is likewise made to correct the original calibrated volume of cell 10 to its actual volume at the temperature of determination. The differences in these corrected volumes of the cell and the injected mercury give the true volumes of the known amount of the gas sample at the respective elevated pressures. This information is then plotted and a graph is secured for the particular gas sample similar to that shown in Figure 6, which indicates the pressure-volume relationship of separator gas at 210° F. By draining the mercury from cell 10 back into the tank 82, requiring actuation of valve 89 to admit the mercury to the vertical conduit 90 leading to the tank, the process can be repeated at any number of elevated temperatures up to the capacity of the heating unit 12.

By the plotting of one or more of these isothermal pressure-volume curves, the engineer can solve many of the problems of gas reserves, compressor types, and capacities of transmission pipe lines in the gas industry. The value of these data lies in the fact that in engineering work there are no perfect gases, that is, those which obey the laws of Charles and Boyle. They do this with fair accuracy for a relatively few pounds pressure above atmospheric, but then the gases begin to deviate, and the magnitude of this deviation varies with the temperature, pressure, and the composition of the gas. It is for the determination of this deviation factor or compressibility factor that the method above described has been developed. By continuing the method from plus ten pounds to one thousand pounds per square inch, then through another cycle starting with cell 10 filled to six hundred or eight hundred pounds per square inch and running up to approximately five thousand pounds, the actual volume occupied by one cubic foot of gas at 60° F. and 14.7 pounds pressure absolute can be accurately determined at any temperature and pressure up to and including the formation temperature and pressure.

Having determined the compressibility factor or the specific volume of the gas, it is now possible to calculate by a simple ratio from the production data of the well during sampling, the equivalent amount of liquid to be added to a definite volume of the gas to give an exact equivalent mixture to that which entered the well bore from the formation during sampling. In other words, said mixture may be considered the reservoir fluid produced by the particular well during the sampling period.

The phase equilibrium determinations are carried out in cell 20. Gas from the sample container 76 is admitted to said previously washed and evacuated cell, valve 85 being open for the purpose. The mercury manifold is open to allow mercury in back of the piston 31 to return to the reservoir tank 82. The piston will therefore rise under the pressure of the gas and the withdrawal of mercury is continued until the piston is very close to the top of its chamber when valve 92 in the mercury manifold and valve 85 in the gas manifold are closed. The quantity of gas in cell 20 is then allowed to come to the temperature of the oil bath surrounding the cell and this temperature is recorded as is also the pressure of the gas indicated by gauges 83 and 84. For accurately measuring this pressure the mercury level in the gas chamber should be adjusted to an exact level with the zero mark 52 which can be accomplished by withdrawing or injecting the required amount of mercury through the calibrated mercury pump 80. The exact volume of the gas within cell 20 is now noted from the position of the index pointer 38 with respect to the scale 39. The pointer is actuated by the piston rod 36 which moves with the piston 31.

From the data obtained during the compressibility determinations, this volume-pressure-temperature information is now translated into cubic feet at 60° F. and 14.7 pounds per square inch absolute. With this gas volume known, it is now possible to calculate from the well test data, giving the number of cubic feet of gas at 60° F. and 14.7 pounds per square inch absolute per barrel of separator liquid under separator pressure and temperature, the exact equivalent volume of liquid contained in the cylinder 78, which must be added to the gas within the gas chamber of cell 20 so that the resultant mixture is equivalent to the reservoir fluid which entered the bottom of the well from the formation during the sampling period. The injection within the cell 20 of this calculated volume of liquid is done as follows:

With valves 85 and 69 closed as regards cell 20, and with valve 92 closed to prevent further withdrawal of mercury from the upper end of cell 20 through conduit 93, and with valve 88 open, pressure is built up in the mercury manifold by pump 80 to approximately the pressure of the gas in the cell and the liquid in container 78, it being understood that the gas and liquid sample are each at the same or separator pressure. The valve 94 is now opened and mercury is forced through the by-pass conduit 96 and through valve 97, which is also open so as to admit the mercury to the gas chamber of cell 20. It is possible to obtain an indication of the mercury entering the gas chamber by means of the window 45. The pressure on the mercury manifold is then noted and valve 94 is closed. Valves 98 and 99 are now opened and the pressure in the cylinder 78 is adjusted by means of pump 80 until it is equal to the gas pressure in cell 20. In order to be sure that this is true, valve 94 is opened, with valves 98 and 99 remaining open, and any slight difference in pressure is equalized throughout the entire system consisting of cell 20, the liquid sample container 78, mercury manifold 60, gauges 83 and 84, and the calibrated mercury pump 80.

Valve 97 remains closed during the above procedure. The exact volume, as indicated on the scale and dial of mercury pump 80, is now read to .01 cc. and recorded. With valve 94 closed and valves 98 and 99 open, the upper valve 97 also being open, a path is provided for the mercury to enter the bottom of container 78 to displace an equal amount of hydrocarbon liquid from said container through valve 97 into the conduit 77 and which is eventually injected into cell 20. The volume of liquid calculated as above to be added to the gas in cell 20 is displaced by the mercury and when the exact amount has been forced from cylinder 78 the valves are closed. To drive out the last remaining quantity of liquid from conduit 77 valve 94 is opened and mercury is forced by pump 80 through the by-pass conduit 96 and into said conduit 77 so that all the liquid is displaced by the mercury, which forces the same into cell 20. When the dropping of mercury from the inner end of conduit 77 is visible from window 45, the valve 94 is closed and the cell 20 is ready for the phase equilibrium determinations.

The said determinations are usually run at three temperatures, one at approximately atmospheric, one at approximately 125° F., and one at the temperature of the reservoir. The oil bath surrounding cell 20 is brought up to the desired temperature by means of the heating unit 22, and the same is maintained constant by the thermo-regulator 23. As soon as the desired temperature is reached stirring motor 40 within cell 20 is started. With one propeller located in the gas chamber and the other located within bore 43 so as to contact the liquid, both phases of the reservoir material are agitated to bring each into intimate contact with the other. In the course of approximately two to three hours complete equilibrium between them is achieved. The motor 40 is then stopped, its heat is allowed to dissipate, and the mercury level is adjusted until the lowest point of the liquid-gas interface is exactly level with the zero mark 52. This is done by opening valves 69 and 88 and manipulating the piston of pump 80. The exact pressure exerted by the mixture within cell 20 is determined by means of dial gauge 83 and piston or dead weight gauge 84. The volume of the gas phase is determined by noting the position of the pointer 38 on scale 39. Then the reading of the mercury pump 80 is recorded. Mercury is now injected by said pump until the topmost position of the liquid-mercury interface is exactly opposite the zero index, and the reading of pump 80 is again recorded.

The difference between this last reading and previous ones, after the application of a correction, due to the capillary displacement of the menisci, is recorded as the volume of equilibrium liquid at the observed temperature, pressure and equilibrium gas volume. The power driven mercury pump 81 is now started and by closing certain valves and opening others mercury can be pumped into the upper end of cell 20 above the piston 31 to force the piston downward, thereby compressing the gas-liquid mixture within the gas chamber. At intervals the pump 81 may be stopped and the pressure on the manifold noted so as to secure an indication as to the approximate pressure rise within the gas chamber. When the pressure has been raised from fifty to two hundred pounds per square inch above the previous equilibrium point the necessary valves are closed and the mercury is confined above piston 31 so as to maintain the desired pressure on the reservoir fluid. The rise in pressure has disturbed the equilibrium of the fluid, and since a new equilibrium must be established the motor 40 is started and allowed to run until equilibrium has been established. After its heat has been dissipated another set of readings of gas-phase volume, liquid-phase volume, and pressure is made. This procedure of raising the pressure, attaining equilibrium, and reading the pressure-volume relationship and liquid-gas relationship is continued until the maximum pressure desired by the operator is obtained. The result of this procedure using the present apparatus has been referred to as the phase equilibrium determinations.

The tabulated data with all necessary corrections is finally plotted on a phase-equilibrium graph, see Figure 8, in which the vertical scale represents barrels of equilibrium liquid per one million cubic feet of gas at 60° F. and 14.7 pounds per square inch absolute, and the horizontal scale represents absolute pressures in pounds per square inch. The tabulated data then forms an isothermal line of the reservoir fluid in equilibrium. Additional isotherms are determined in the same manner as described and on the identical sample. Operation of the apparatus for determining these additional isotherms is as follows:

Valves 92 and 89 are opened to permit the mercury contained in the upper portion of cell 20 in back of piston 31 to return to tank 82, which takes place automatically as the gas pressure within the chamber will force the piston to the top of the cell. This lowering of the pressure will cause a precipitation of liquid from the gas phase. The liquid is allowed to drain down the sides of the gas chamber while the temperature of the oil bath is raised to the next temperature level. Following this, the second set of pressure-volume data for the gas and liquid is accumulated. This data may be plotted on the same graph as the first. The resulting graph will appear very much as in Figure 8, showing three isothermal liquid phase curves. A graph such as shown in Figure 7 may also be plotted from the data obtained as above described, which indicates the pressure-volume relationship of reservoir fluid.

The information about the behavior of a reservoir material obtained by this apparatus eliminates many of the errors inherent in other devices. First and foremost of these is the integrity of the sample. A high pressure, wet gas contains in its reservoir condition an appreciable quantity of heavy hydrocarbons. These are in the vapor phase due to the temperature and pressure under which they exist in the reservoir. As these reservoirs are produced, both the temperature and pressure are reduced as the material comes up the well bore. This upsets the equilibrium of the material and causes a precipitation of a large part of the heavy hydrocarbons in the form of liquid. This liquid may exist in the well bore in the form of liquid slugs, or as a liquid film on the walls of the flow string, or as a mist or fog in the gas stream, or a combination of all three. As a result of this condition, attempts to sample this unstable and non-uniform material by diverting a small quantity through a miniature separation plant provides the opportunity for serious error. This possibility is eliminated by taking the samples at the field separator. Here the separation of the two phases is approaching, if not actually in complete equilibrium. As long as the gas has been reduced in pressure to or below the pressure at which the precipitation of liquid occurs, the materials are relatively stable and can be handled in the laboratory with considerable ease.

With respect to the present apparatus, it should be noted that any number of phase equilibrium determinations can be made on one sample of material. These determinations are therefore comparative because they are made on the same sample. Also as a result of the visibility features of the cell 20 the phases of the reservoir material may be actually seen, and questionable readings can be checked for accuracy at any time up to the discarding of the sample.

Another advantage of the present apparatus is that after all the required graphical data have been obtained, it is entirely feasible to secure equilibrium at any point of temperature and pressure, and withdraw for analysis a sample of the liquid or gas, or both, thus answering the specific question of composition at one critical point of equilibrium. Additional analyses can be made by preparing additional mixtures of liquid and gas in the cell.

A further advantage of the improved apparatus resides in the fact that the measurement of the volume of separator gas within cell 20 is made on the basis of actual determined compressibility of that gas and not upon a value calculated by means of critical data from the analysis. There is reason to believe that calculated compressibilities are subject to errors. By using the actually determined compressibility such errors are circumvented. The behavior of the material under temperature and pressure is determined instead of attempting to predict its behavior from necessarily incomplete data.

In this connection, an alternate method is disclosed which may be used to determine compressibility of gas at elevated temperature and pressure where only one set of data is required. In cases where the entire compressibility curve data are not needed but instead only the one datum; namely, the true volume of the gas under the predetermined pressure and temperature at which it is injected into the variable volume cell for the phase equilibrium determination, an alternate and much simplified method of securing this compressibility datum is followed. It consists of measuring the gas sample into the compressibility of cylinder 10 at approximately 10 pounds above atmospheric and at approximately room temperature. This volume is converted to volume at 60° F. and 14.7# absolute. The oil bath is then heated to the desired temperature after which mercury is pumped into the cylinder 10 by power pump until the resultant pressure, as indicated by piston gage, is at the desired point. As soon as the entire cylinder, mercury, and tank assembly are uniformly at the desired temperature, as indicated by a stable pressure, the true volume occupied by the known quantity of gas at the new conditions of temperature and pressure is determined. This is possible by displacement of the compressed gas with a measured quantity of mercury from volumetric pump, maintaining the pressure and temperature at the above attained level during displacement. Under these conditions, the cylinder 10 is already expanded by heat and pressure, and the effects of heat and pressure on the mercury is stable. The only variable for which correction must now be made is the increase in volume of the mercury used to displace the gas due to the increase in temperature from room to the oil bath. This method is much more rapid as only at one point must the compressibility be determined; the major part of the pumping is done by power means, and only one volume measurement need be made; this one volume corrected for but one change in condition, namely, temperature.

The invention as hereinabove set forth may be variously embodied within the scope of the following claims.

What is claimed is:

1. In apparatus of the character described, a cylindrical member having a movable piston to provide a gas chamber of variable volume below the piston, the lower end of said gas chamber comprising a bore of smaller diameter than the remainder of the chamber, the cylindrical wall of the member having a longitudinal slot for substantially the length of said bore of smaller diameter, a glass window retained by said member so as to close and seal the said slot whereby material within said bore is visible from the exterior of the member, means for admitting a gas to the variable volume chamber below the piston, conduit means for connecting the interior of said bore in the base thereof with a source of mercury supply, and similar conduit means for connecting the interior of the member above the piston with the same source of mercury supply.

2. In apparatus of the character described, a cylindrical member having a movable piston to provide a gas chamber of variable volume below the piston, the lower end of said gas chamber comprising a bore of smaller diameter than the remainder of the chamber, the cylindrical wall of the member having a longitudinal slot for substantially the length of said bore of smaller diameter, a glass window retained by said member so as to close and seal the said slot whereby material within said bore is visible from the exterior of the member, a pair of glass sealed openings provided in the wall of said member above the bore for viewing the material in the gas chamber, means for admitting a gas to the variable volume chamber below the piston, conduit means for connecting the interior of said bore in the base thereof with a source of mercury supply, and similar conduit means for connecting the interior of the member above the piston with the same source of mercury supply.

3. In apparatus of the character described, a cylindrical member having a movable piston to provide a gas chamber of variable volume below the piston, the lower end of said gas chamber comprising a bore of smaller diameter than the remainder of the chamber, the cylindrical wall of the member having a longitudinal slot for substantially the length of said bore of smaller diameter, a glass window retained by said member so as to close and seal the said slot whereby material within said bore is visible from the exterior of the member, means for admitting a gas to the variable volume chamber below the piston, an electric motor positioned within the gas chamber and having an armature shaft extending within the bore of smaller diameter, and propellers fixed to the shaft and located in the gas chamber and in the said bore respectively.

4. In apparatus of the character described, a cylindrical member having a movable piston to provide a gas chamber of variable volume below the piston, the lower end of said gas chamber comprising a bore of smaller diameter than the remainder of the chamber, the cylindrical wall of the member having a longitudinal slot for substantially the length of said bore of smaller diameter, a glass window retained by said member so as to close and seal the said slot whereby material within said bore is visible from the exterior of the member, means for admitting a gas to the variable volume chamber below the piston, a sealing gasket positioned between the glass window and the wall of the cylindrical member, said gasket also having a slot substantially aligned with the slot in the member, and a mark on said glass window providing a zero mark for use in the volumetric measurements of the material within the bore.

5. A variable volume cell for use in analyzing reservoir fluid comprising, a cylindrical member having a bore extending internally of the same from end to end, said bore including a major portion of large diameter and a portion below the same of small diameter, a movable piston within the member having association with the large diameter portion of said bore, a cap removably secured to the top of the member thereby forming a compartment above the piston, a piston rod secured to said piston and extending through the cap, a valved fitting secured to the base of the member for connecting the small diameter bore with a source of mercury supply, a conduit secured to the cap for supplying the compartment above the piston with mercury from said source, said bore below the piston forming a chamber therewith and which has communication with the small diameter bore, and a second conduit extending through the wall of the member into said chamber for supplying a fluid thereto.

6. A variable volume cell for use in analyzing reservoir fluid comprising, a cylindrical member having a bore extending internally of the same from end to end, said bore including a major portion of large diameter and a portion below the same of small diameter, a movable piston within the member and having association with the large diameter portion of said bore, a cap removably secured to the top of the member thereby forming a compartment above the piston, a piston rod secured to said piston and extending through the cap, a valved fitting secured to the base of the member for connecting the small diameter bore with a source of mercury supply, a conduit secured to the cap for supplying the compartment above the piston with mercury from said source, said bore below the piston forming a chamber therewith and which has communication with the small diameter bore, means for admitting a gas to the gas chamber below the piston, said member having a longitudinal slot for the greater portion of the small diameter bore, and a glass window retained by the member so as to close and seal said slot whereby the material in the small diameter bore is visible from the exterior of the member.

7. A variable volume cell for use in analyzing reservoir fluid comprising, a cylindrical member having a bore extending internally of the same from end to end, said bore including a major portion of large diameter and a portion below the same of small diameter, a movable piston within the member having association with the large diameter portion of said bore, a cap removably secured to the top of the member thereby forming a compartment above the piston, a piston rod secured to said piston and extending through the cap, a valved fitting secured to the base of the member for connecting the small diameter bore with a source of mercury supply, a conduit secured to the cap for supplying the compartment above the piston with mercury from said source, said bore below the piston forming a chamber therewith and which has communication with the small diameter bore, a second conduit extending through the wall of the member into said chamber for supplying a fluid thereto, an electric motor positioned within the gas chamber and having an armature shaft extending within the small diameter bore, and propellers fixed to said shaft and located in the gas chamber and in the small diameter bore respectively.

8. A variable volume cell for use in analyzing reservoir fluid, comprising, an elongated member having a bore extending through the same, said bore including a major portion of large diameter and a portion below the same of small diameter, a movable piston located within the large diameter portion of said bore to thereby form a chamber below the same including the bore of small diameter, a window extending longitudinally of said small diameter bore whereby the interior of the chamber is visible, other windows located in the member substantially diametrically thereof for viewing the interior of the chamber, a conduit extending through the wall of the member into said chamber for supplying a fluid thereto, and conduit means connected to the top and bottom of the member for supplying a pressure medium above the piston and to the small diameter bore respectively.

9. A variable volume cell as defined by claim 8 additionally including an electric motor located in the chamber, an armature shaft extending from the motor to within the bore of small diameter, and propellers fixed to said shaft and located in the large diameter bore and in the small diameter bore respectively.

J. PAUL SLOAN.

CERTIFICATE OF CORRECTION.

Patent No. 2,380,082.   July 10, 1945.

JAMES PAUL SLOAN.

It is hereby certified that error appears in the printed specification of the above numbered patent requiring correction as follows: Page 4, second column, line 55, after "residual" insert --liquid in cell 20. At the end of the mercury--; page 7, first column, line 73, before "cylinder" strike out "of"; and that the said Letters Patent should be read with this correction therein that the same may conform to the record of the case in the Patent Office.

Signed and sealed this 20th day of November, A. D. 1945.

Leslie Frazer (Seal)   First Assistant Commissioner of Patents.